(12) United States Patent
Masuki (10) Patent No.: US 7,936,524 B2
(45) Date of Patent: May 3, 2011

(54) LENS BARREL

(75) Inventor: Akihiko Masuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/699,546

(22) Filed: Feb. 3, 2010

(65) Prior Publication Data

US 2010/0208365 A1 Aug. 19, 2010

(30) Foreign Application Priority Data

Feb. 17, 2009 (JP) ................................. 2009-033905

(51) Int. Cl.
*G02B 7/02* (2006.01)
(52) U.S. Cl. ........ 359/819; 359/822; 359/823; 359/825; 359/826; 359/827
(58) Field of Classification Search .................. 359/808, 359/811, 819, 822, 823, 825–827
See application file for complete search history.

(56) References Cited

U.S. PATENT DOCUMENTS

| 6,788,475 | B2 * | 9/2004 | Nomura et al. | 359/819 |
| 7,372,638 | B2 * | 5/2008 | Yoshii et al. | 359/825 |
| 7,463,824 | B2 * | 12/2008 | Yumiki et al. | 359/823 |
| 2004/0042090 | A1 * | 3/2004 | Nomura | 359/819 |
| 2004/0051981 | A1 * | 3/2004 | Nomura | 359/822 |

FOREIGN PATENT DOCUMENTS

JP 05-027302 2/1993

* cited by examiner

*Primary Examiner* — Evelyn A. Lester
(74) *Attorney, Agent, or Firm* — Cowan, Liebowitz & Latman, P.C.

(57) ABSTRACT

A barrier unit which can be easily assembled to a lens holding member in view of the above problems. The direction in which a barrier unit is rotated when the barrier unit is assembled with a lens holding member coincides with the direction in which a barrier blade driving member is rotated when the barrier blade is closed from the open state.

4 Claims, 11 Drawing Sheets

LENS BARREL

BACKGROUND OF THE INVENTION

1. Field of the Invention

The present invention relates to a lens barrel of an optical apparatus such as a camera.

2. Description of the Related Art

A camera is generally classified into a zoom camera enabling the change of the focal length of a photographic lens and a single focus camera whose focal length is fixed. Most of these cameras are provided with a lens barrel capable of protruding and retracting a photographic lens to downsize a camera when an image is not being captured (or when a power supply is turned off) and to enable to change focal length when an image is being captured (or when the power supply is turned on).

In recent years, there has been required a technique for reducing cost of these cameras while improving the functions thereof. This urges the development of a technique by which not only the cost for components is reduced, but also assembly workability is improved to reduce assembly man-hours and damaged products due to assembly error, thereby totally reducing the cost.

For example, in general, there exists a photographing apparatus such as a camera which is provided with a barrier mechanism for protecting the front face of a lens barrel from external dust. A technique has been proposed for facilitating an assembly workability in the barrier mechanism of this type. Japanese Laid-Open Patent Publication (Kokai) No. 05-27302, for example, discloses a prior art by which the barrier mechanisms are unitized to directly attach the unit to a lens holding member.

Figure 11:
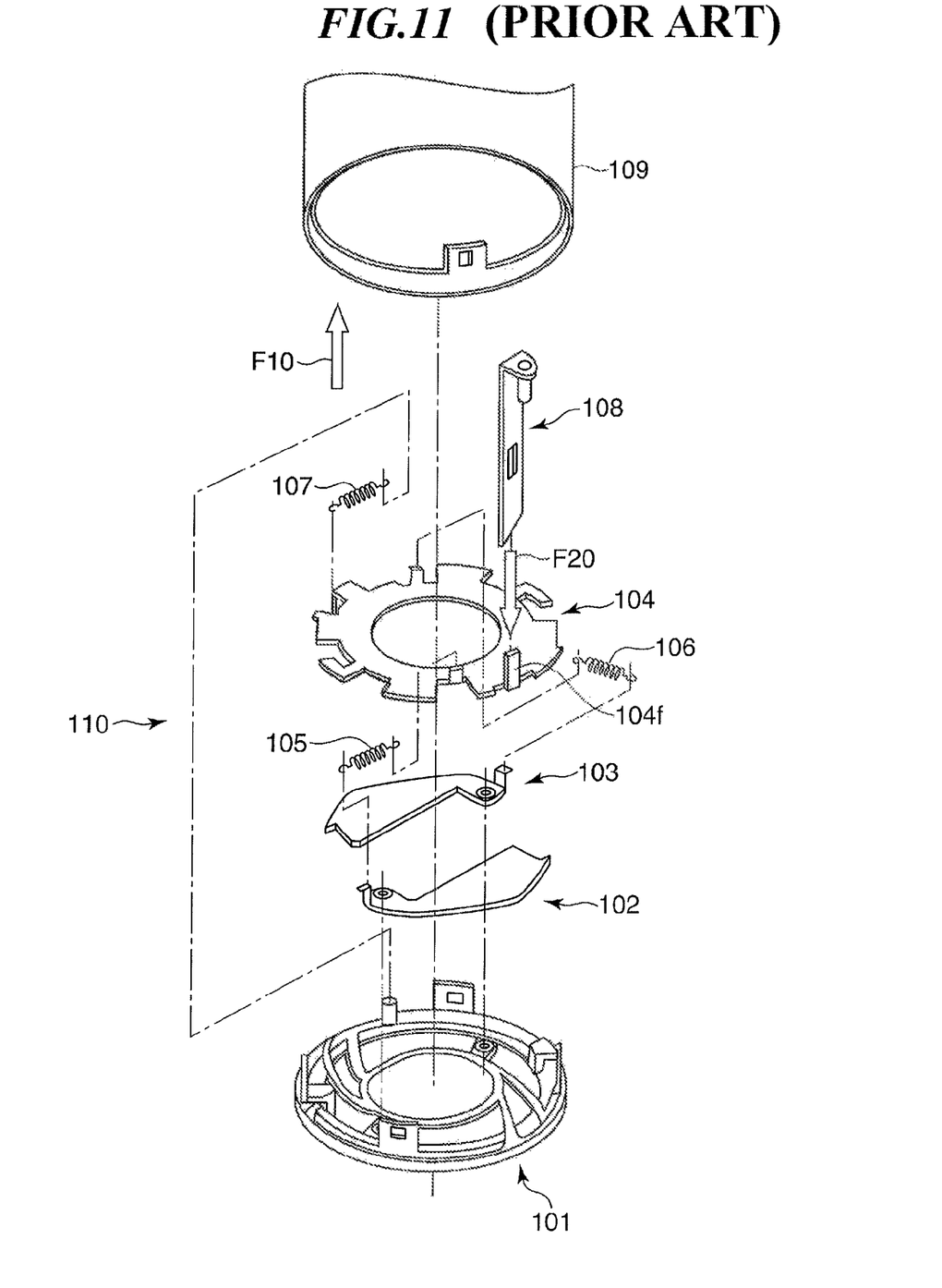
FIG. 11 is an exploded view showing the barrier unit in a prior art.

FIG. 11 is an exploded view showing the barrier unit in a prior art.

A barrier unit 110 is configured such that barrier blades 102 and 103, a drive ring 104, and springs 105, 106, and 107 are assembled with a base member 101, and attached to a lens barrel 109 incorporating a photographic lens (not shown). The drive ring 104 is rotated with respect to the base member 101 to open and close the barrier blades 102 and 103 using the urging force of the springs 105, 106, and 107.

A protrusion 104*f* extending in the direction parallel to an optical axis is formed on the drive ring 104 to open and close the barrier blades 102 and 103. Furthermore, a driving lever 108, engaged with the protrusion 104*f* to rotate the drive ring 104, is provided slidably in the direction of the optical axis on the inner surface of the lens barrel 109.

There has been known, as a technique for opening and closing the barrier of the barrier unit 110, a mechanism in which the protrusion 104*f* is provided on the drive ring 104 for opening and closing the barrier blades 102 and 103 and the driving lever 108 is caused to abut on the protrusion 104*f* to rotate the drive ring 104.

However, in the prior arts described above, when the open state of the barrier blades 102 and 103 is transformed to the closed state thereof, the direction of a force F20 applied to the driving lever 108 from the protrusion 104*f* is opposite to the direction of a force F10 applied when the barrier unit 110 is assembled. In other words, the direction of the force applied, when the barrier blades 102 and 103 are being closed, acts on the direction in which the barrier unit 110 is disassembled, so that the barrier unit 110 may easily drop out of the lens barrel 109. The problem cannot be sufficiently avoided even if a hooking mechanism such as a hook is provided on the barrier unit 110.

On the other hand, the problem can be avoided by firmly fixing the barrier unit 110 to the lens barrel 109 by means of screwing or gluing, however, in this case, the number of fixing components and the assembly man-hour increase and the gluing brings about damaged products. Thus, in this prior art, the assembly workability cannot be eventually simplified even if the barrier mechanisms are unitizeed, so that the total cost cannot be reduced in manufacturing a camera.

SUMMARY OF THE INVENTION

The present invention is directed to enable a barrier unit to be easily assembled to a lens holding member in view of the above problems. Furthermore, the present invention is directed to provide a lens barrel which realizes cost reduction due to an increase in workability without the need for other means such as screwing or gluing for firmly fixing the barrier unit.

In a first aspect of the present invention, there is provided with a lens barrel comprising a barrier unit provided on the front side of a photographic lens and configured to gate an aperture of the photographic lens, and a lens holding member capable of being attached to the barrier unit and configured to hold the photographic lens, wherein the barrier unit includes a cover member having an aperture with the optical axis as a center, a barrier blade attached to the cover member such that the aperture can be opened or closed, a barrier blade driving member which is rotatably held with the cover member and has a rotation transmission protrusion extending to the side of an object in the direction of the optical axis, and a rotation regulating member formed on the lens holding member and configured to regulate the rotation of the barrier unit when the barrier unit is assembled with the lens holding member while being rotated, and wherein the direction in which the barrier unit is rotated when the barrier unit is assembled with the lens holding member coincides with the direction in which the barrier blade driving member is rotated when the barrier blade is closed from the open state.

According to the present invention, the barrier unit can be easily assembled to a lens holding member. Since the direction in which the barrier unit is rotated when the barrier unit is assembled with the lens holding member coincides with the direction in which the barrier blade driving member is rotated when the barrier blade is closed from its open state, the need for other means such as screwing or gluing for firmly fixing the barrier unit is eliminated to allow the reduction of assembly time due to an improvement in workability and the reduction of cost due to a decrease in the number of damaged products.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

An embodiment of the present invention is described below with reference to the drawings.

[Outer Appearance of Camera]

Figure 1:
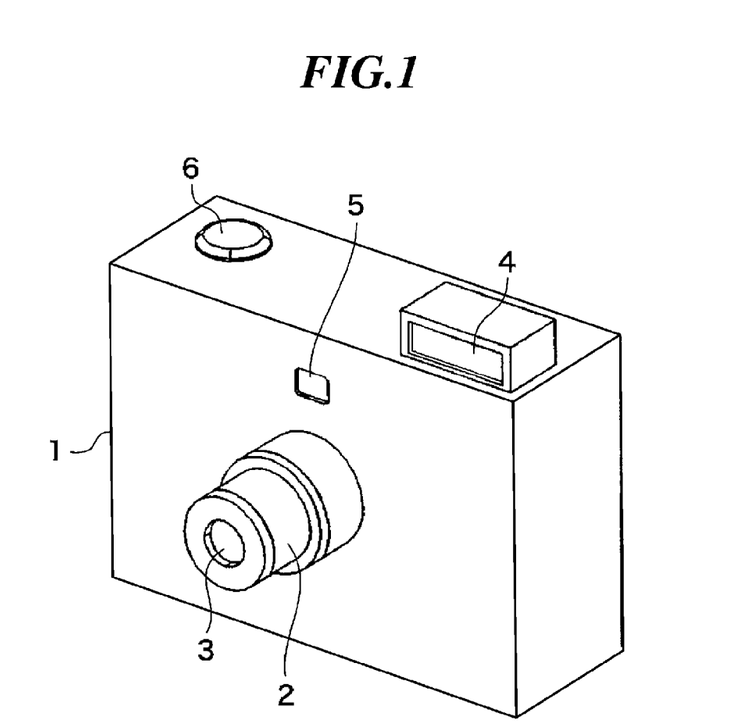
FIG. 1 is a schematic diagram of outer appearance of a camera to which a lens barrel of the present invention is applied.

FIG. 1 is a schematic diagram of outer appearance of a camera to which a lens barrel of the present invention is applied.

In FIG. 1, a lens barrel 2 capable of changing the focal length of an imaging optical system is provided on the front surface of a camera body 1. A barrier 3 for gating an aperture of the imaging optical system in accordance with the power supply mode of the camera set to either ON or OFF is provided on the front side of the lens barrel 2.

A light emission window portion 4 for forming a flash apparatus for illuminating an object is provided on the top surface of the camera body 1. A viewfinder window 5 is provided on the front surface of the camera body 1. Provided on the top surface of the camera body 1 is a release button 6 for starting a shooting preparation operation (focus adjustment operation and light metering operation) and shooting operation (exposure to a film or an image sensor such as a CCD).

A camera shown as an example in FIG. 1 is typical in configuration. The camera according to the present invention is not limited to the above configuration provided that the camera includes a lens barrel and a barrier provided on the front side of the lens barrel.

[Configuration of Lens Barrel]

The configuration of the lens barrel 2 in FIG. 1 is described below with reference to FIG. 2.

Figure 2:
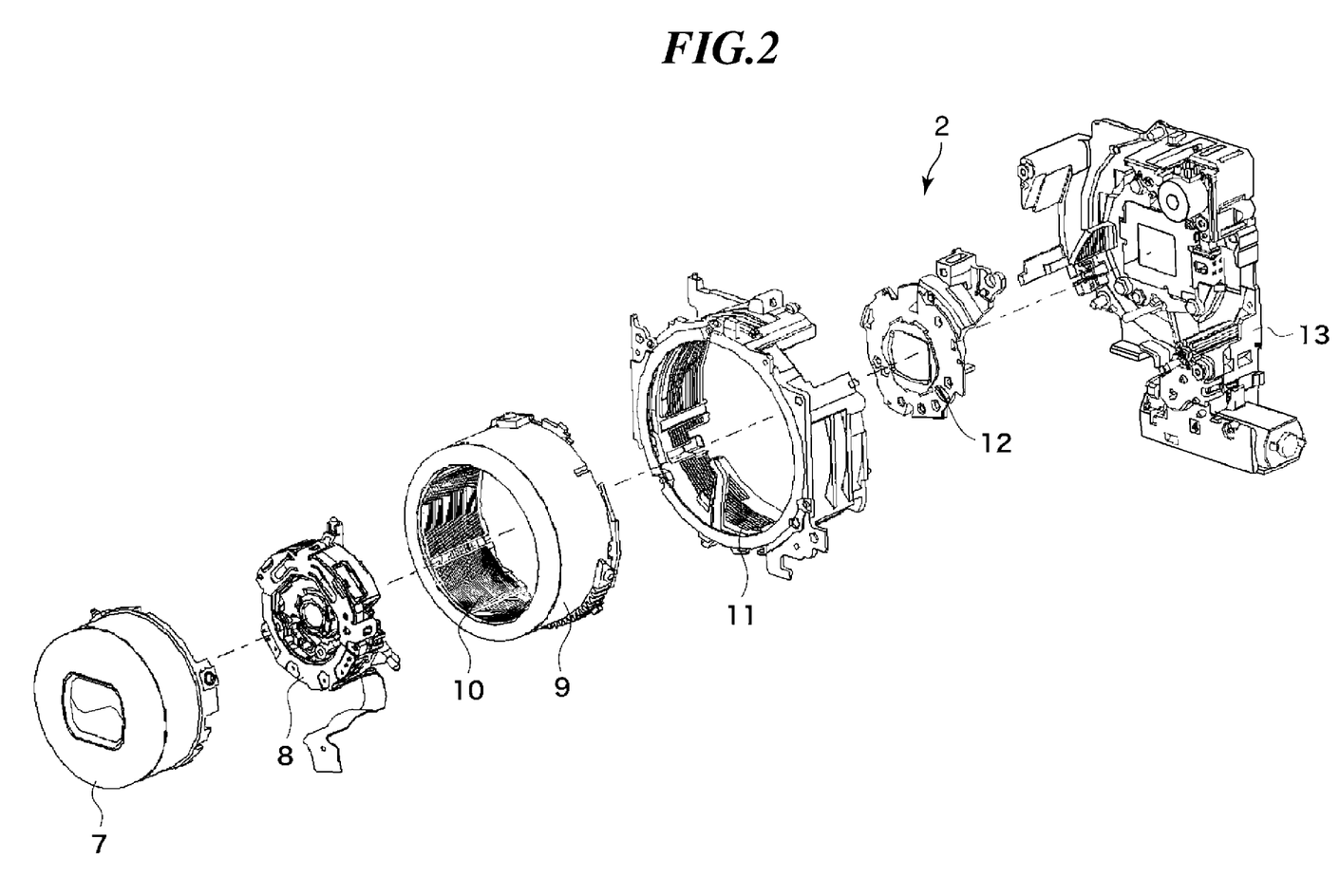
FIG. 2 is an exploded perspective view showing a configuration of the lens barrel in FIG. 1.

FIG. 2 is an exploded perspective view showing a configuration of the lens barrel 2 in FIG. 1.

In FIG. 2, the lens barrel 2 includes a first group lens barrel 7, a second group lens barrel 8, a moving cam ring 9, a rectilinear motion barrel 10, a stationary tube 11, a third group lens barrel 12, and an image sensor holding member 13.

As described later with reference to FIG. 3, the first group lens barrel 7 holds a photographic lens 17 and includes a barrier unit 15. The second group lens barrel 8 holds a second group photographic lens (not shown) and includes an anti-vibration lens mechanism and a shutter and a diaphragm mechanism which are not shown.

The moving cam ring 9 is provided on its inner periphery with a driving cam for driving the first group lens barrel 7 and the second group lens barrel 8 and includes a gear portion to which power is transmitted by a lens barrel driving motor. The rectilinear motion barrel 10 is rotatably held by the moving cam ring 9 and rectilinearly moves the first group lens barrel 7 and the second group lens barrel 8. The stationary tube 11 is provided on its inner periphery with a driving cam for driving the moving cam ring 9.

The third group lens barrel 12 holds a third group photographic lens. The image sensor holding member 13 includes a cam abutting portion 13a abutting on a rotation transmission protrusion 22c of a barrier blade driving member 22 described later with reference to FIG. 4.

The configuration of the lens barrel 2 is not limited to the above one, provided that the configuration thereof satisfies the features of the present invention described below.

[Configuration of First Group Lens Barrel]

The configuration of the first group lens barrel 7 is described below with reference to FIG. 3.

Figure 3:
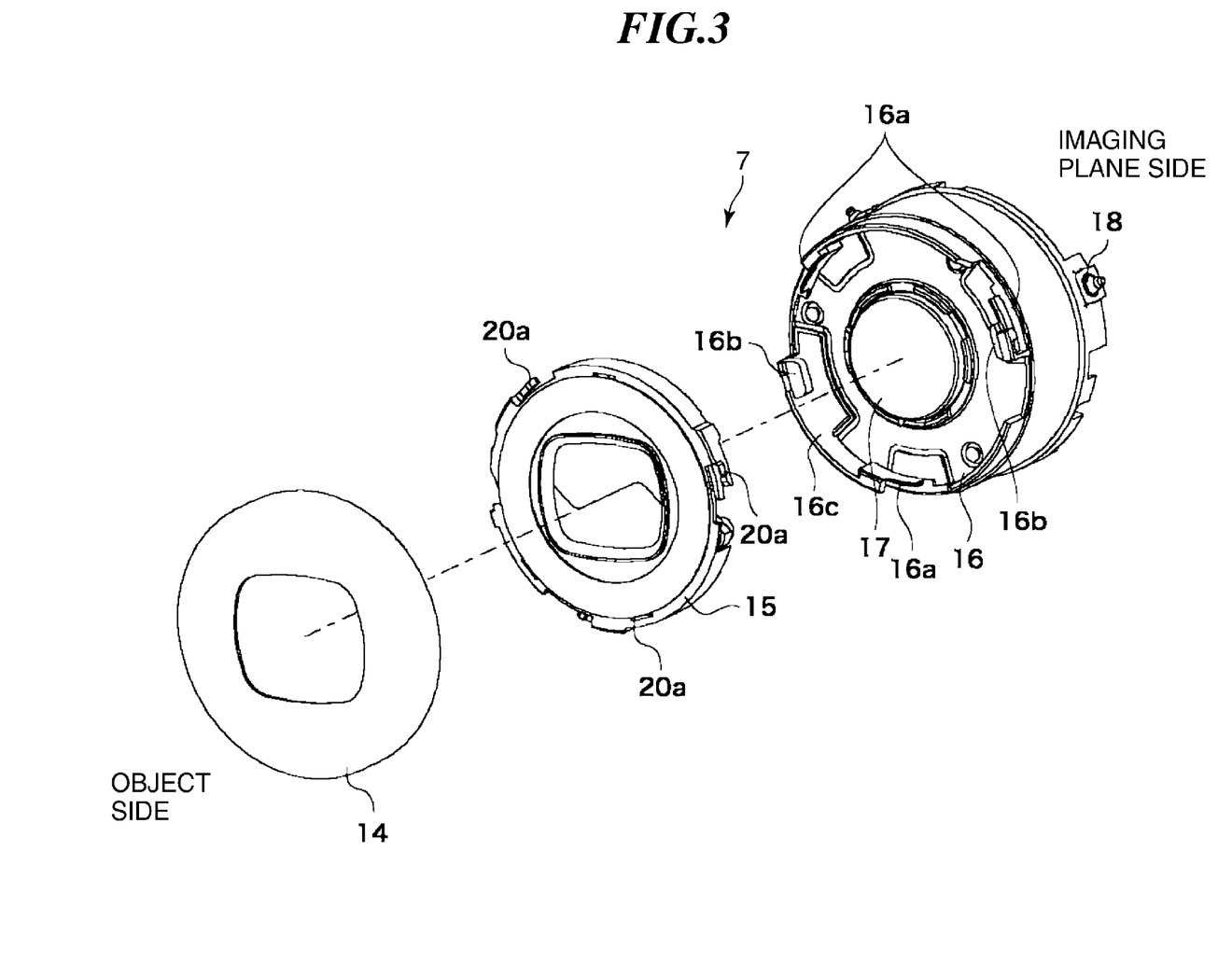
FIG. 3 is an exploded perspective view showing a configuration of a first group lens barrel in FIG. 1.

FIG. 3 is an exploded perspective view showing a configuration of the first group lens barrel 7 in FIG. 1.

The first group lens barrel 7 includes a lens holding member 16 holding the photographic lens 17 and capable of being attached to the barrier unit 15 forming the barrier 3 shown in FIG. 1.

Specifically, the photographic lens 17 is fixed to the lens holding member 16 by gluing. Three follower pins 18 to be fitted into the cam grooves of the moving cam ring 9 in FIG. 2 are press-fitted on the imaging-plane side of the lens holding member 16. The barrier unit 15 covering the photographic lens 17 is rotatably attachable on the object side of the lens holding member 16.

Specifically, three hook portions 20a extending in the circumferential direction of an after-mentioned barrier cover member 20, which consists of the barrier unit 15, are hooked on a catching portion 16a provided on the outer peripheral side of the lens holding member 16 to fix the barrier unit 15 to the lens holding member 16. In other words, the catching portion 16a catches the hook portion 20a on the lens holding member 16 in the circumferential direction to regulate the rotation of the barrier unit 15.

Figure 4:
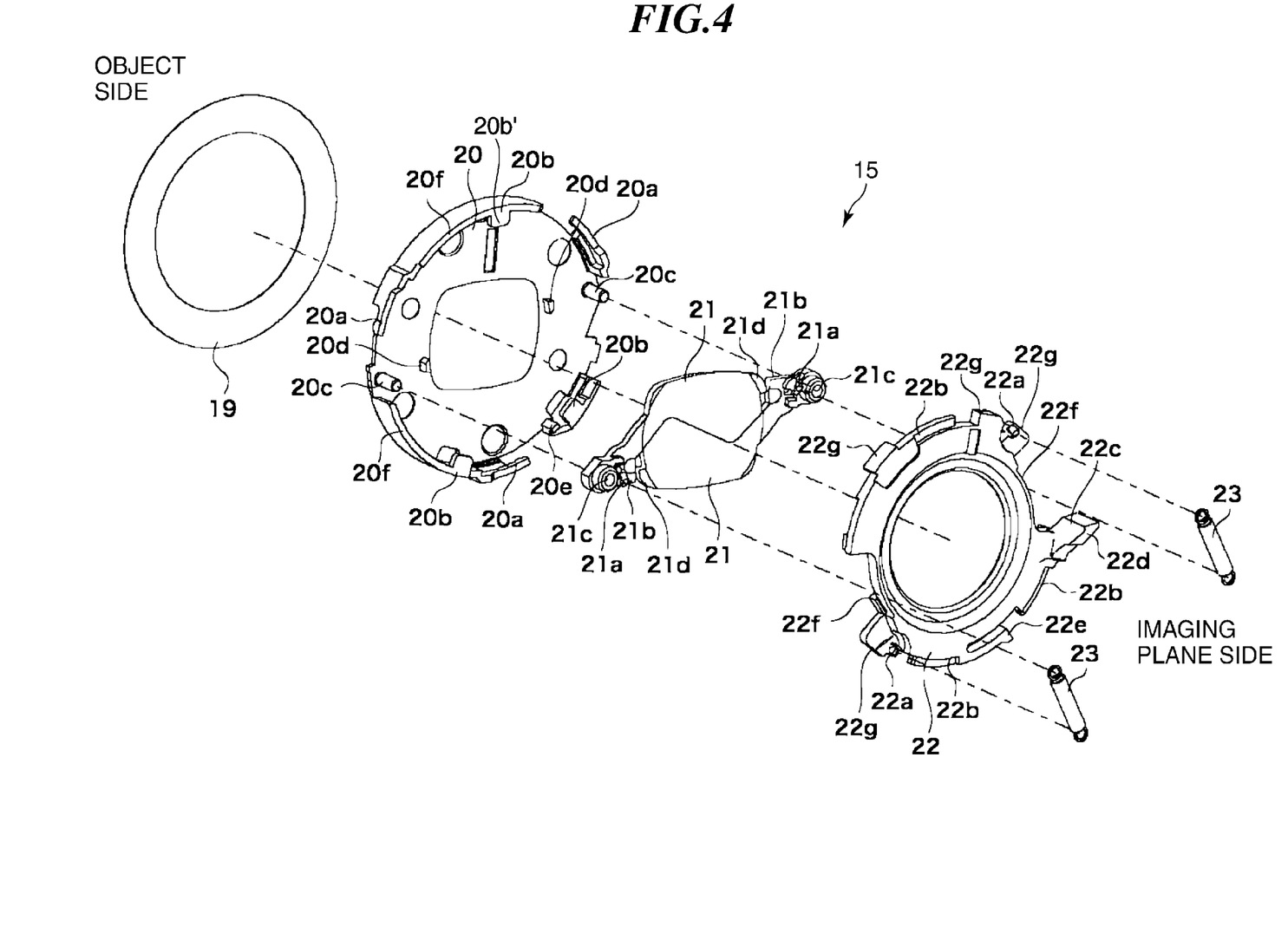
FIG. 4 is an exploded perspective view showing a configuration of a barrier unit according to the present embodiment.

A double-faced tape 19 described later with reference to FIG. 4 is attached to the barrier unit 15. A mount of the double-faced tape 19 is peeled and a cap 14 is attached to the barrier unit 15, thus completing the first group lens barrel 7.

Thus, the first group lens barrel 7 according to the present embodiment is roughly composed of the cap 14, the barrier unit 15, and the lens holding member 16. Accordingly, assembly man-hours are shortened and assembly workability is simple because neither screwing nor gluing is required.

[Configuration and Assembly of Barrier Unit]

The configuration and assembly of the barrier unit 15 according to the present embodiment are described below with reference to FIG. 4.

FIG. 4 is an exploded perspective view showing a configuration of the barrier unit 15 according to the present embodiment.

The barrier unit 15 according to the present embodiment includes the barrier cover member 20, a pair of barrier blades 21, the barrier blade driving member (drive ring) 22, and a pair of springs 23.

The barrier cover member 20 includes an aperture with the optical axis as a center. The barrier blades 21 are attached to the barrier cover member 20 so that the aperture of the barrier cover member 20 can be opened or closed.

The barrier blade driving member 22 is rotatably held with the barrier cover member 20 and includes the rotation transmission protrusion 22c extending to the side of an object in the direction of the optical axis. The spring 23 is stretched between the barrier blade 21 and the barrier blade driving member 22.

The assembly of the barrier unit 15 is described below.

The barrier cover member 20 having the aperture with the optical axis as a center acts as a base for assembling the barrier unit 15. Two rotational axes 20c provided on the imaging-plane side of the barrier cover member 20 are fitted into a pair of axial holes 21c of the barrier blade 21 to assemble the barrier blade 21 into the barrier cover member 20 from the imaging plane side. Furthermore, the barrier blade driving member 22 is assembled to the barrier cover member 20 from the imaging plane side such that the barrier blade driving member 22 is held by three protrusions 20b protruding toward the optical axis from the outer wall of the barrier cover member 20. After that, the barrier blade driving member 22 is rotated clockwise when viewed from the imaging plane side. Thereby, an elastic claw portion 22e overrides a stopper portion 20e of the barrier cover member 20 and is fitted thereinto, preventing detachment in the radial direction.

In this state, each of the two springs 23 hooks the corresponding hook portion 21a of the barrier blade 21 and the corresponding hook portion 22a of the barrier blade driving member 22 respectively to rotate the barrier blade driving member 22 clockwise by a spring force when viewed from the imaging plane side. Protrusions 22f abut on an abutting portions 21b of the barrier blade 21 to cause the barrier blades 21 to rotate counterclockwise with the rotational axes 20c as a center respectively, opening the barrier blades 21.

Rotating the barrier blade driving member 22 clockwise causes three protrusions 20b of the barrier cover member 20 to overlap with three sliding portions 22b of the barrier blade driving member 22 to prevent detachment in the direction of the optical axis.

Finally, the double-faced tape 19 is attached to the object side of the barrier cover member 20 to complete the barrier unit 15.

The barrier unit 15 slidably fits inner peripheries of outer wall 20f of the barrier cover member 20 to several outermost peripheries 22g of the barrier blade driving member 22 in the radial direction. The three protrusions 20b of the barrier cover member 20 have sliding holding portions 20b' protruding radially inward respectively. The barrier blade driving member 22 is sandwiched between the faces of the sliding holding portions 20b' on the object side thereof and the wide surface of the barrier cover member 20 on the imaging-plane side thereof to fit the barrier blade driving member 22 thereinto in the direction of the optical axis, thereby maintaining assembling accuracy.

[Assembly of Barrier Unit with Lens Holding Member]

Figure 5:
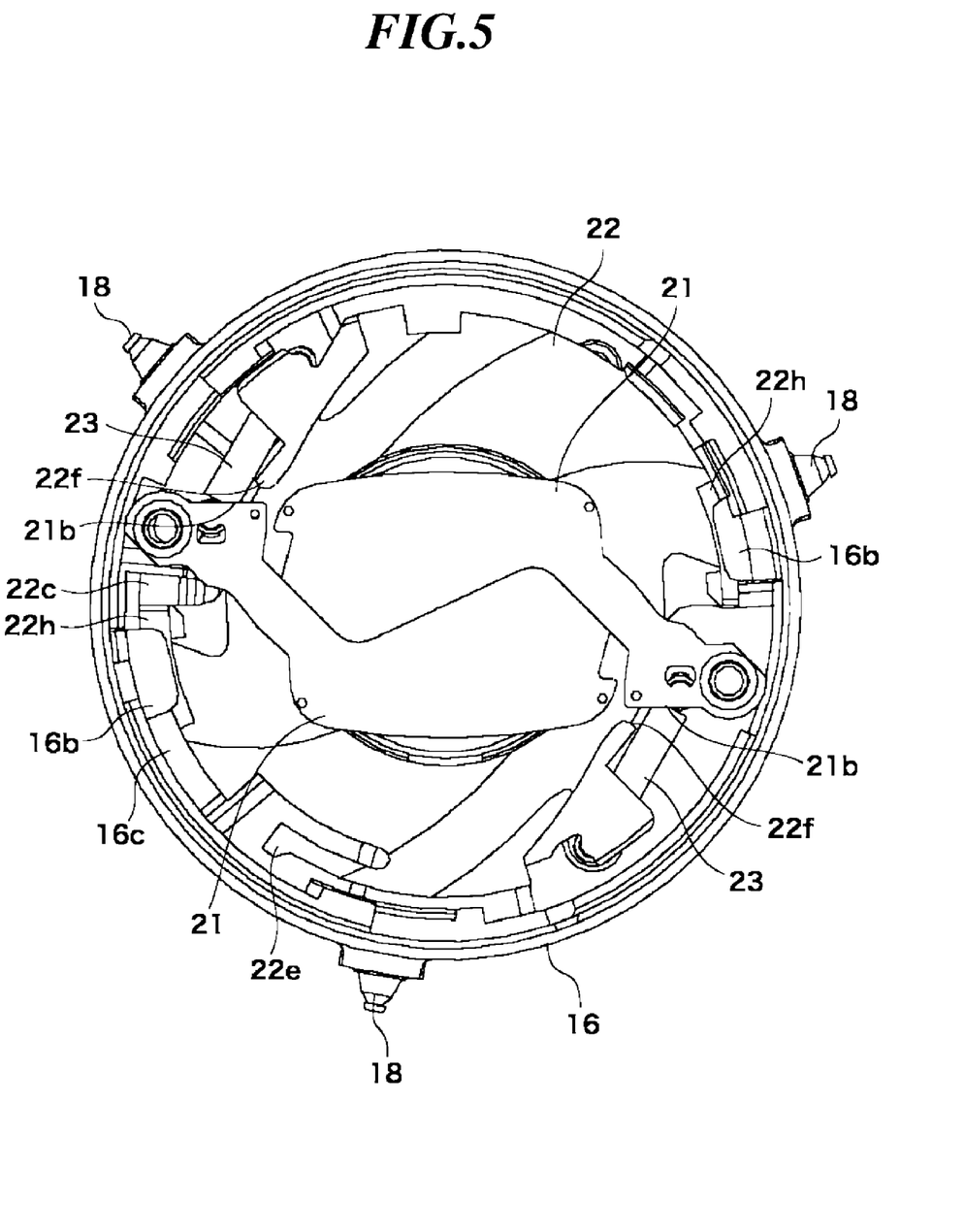
FIG. 5 is a diagram viewed from the object side with the barrier unit assembled with a lens holding member.

The assembly of the barrier unit 15 with the lens holding member 16 is described below with reference to FIG. 5. FIG. 5 is a diagram viewed from the object side with the barrier unit 15 assembled with the lens holding member 16. For the sake of simplifying a relationship between the barrier blade driving member 22 and the lens holding member 16, the barrier cover member 20 and the double-faced tape 19 are omitted.

As shown in FIG. 5, two protrusions 16b protruding radially inward from the outer wall are formed on the leading edge of the lens holding member 16.

As described above, the barrier unit 15 is assembled with the lens holding member 16 in a rotational manner. When assembling the barrier unit 15, the rotation transmission protrusion 22c of the barrier blade driving member 22 is completely inserted into a hole portion 16c of the lens holding member 16 in the direction of the optical axis and then the barrier unit 15 is rotated in the direction in which a hook portion 20a of the barrier cover member 20 catches the rotation transmission protrusion 22c.

At this point, two sliding surfaces (surfaces on the object side) 22h of the barrier blade driving member 22, located substantially on the other side of the surface on which the rotation transmission protrusion 22c are located, are drawn into the lower side (on the object side) of protrusions 16b of the lens holding member 16 to overlap the protrusions 16b in the direction of the optical axis. This positional relationship is maintained from the open state to the closed state of the barrier blades 21. Thereby, the protrusions 16b of the lens holding member 16 high in rigidity can be subjected to force components in the direction of the optical axis transmitted from the cam abutting portion 13a of the image sensor holding member 13 described later in FIG. 8.

In the present embodiment, although the two protrusions 16b of the lens holding member 16 are provided substantially symmetrically with respect to the optical axis, two or more protrusions are not always required. At least one protrusion may be provided in the vicinity of the rotation transmission protrusion 22c subjected to a strong force.

[Opening and Closing Operation of Barrier]

The opening and closing operation of the barrier is described below with reference to FIGS. 5 to 10.

Figure 6:
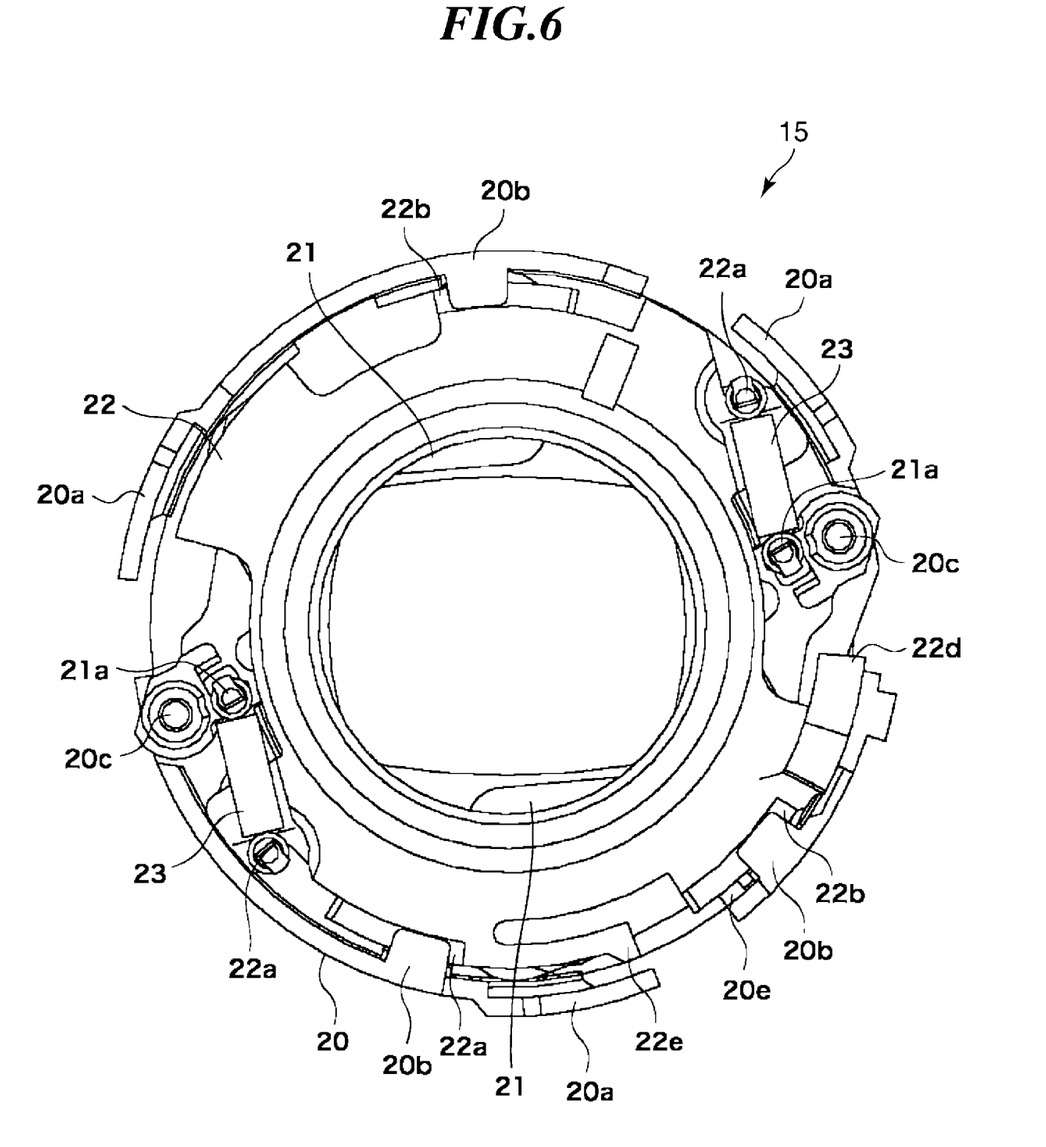
FIG. 6 is a diagram showing the open state of the barrier unit viewed from the imaging plane side.
Figure 7:
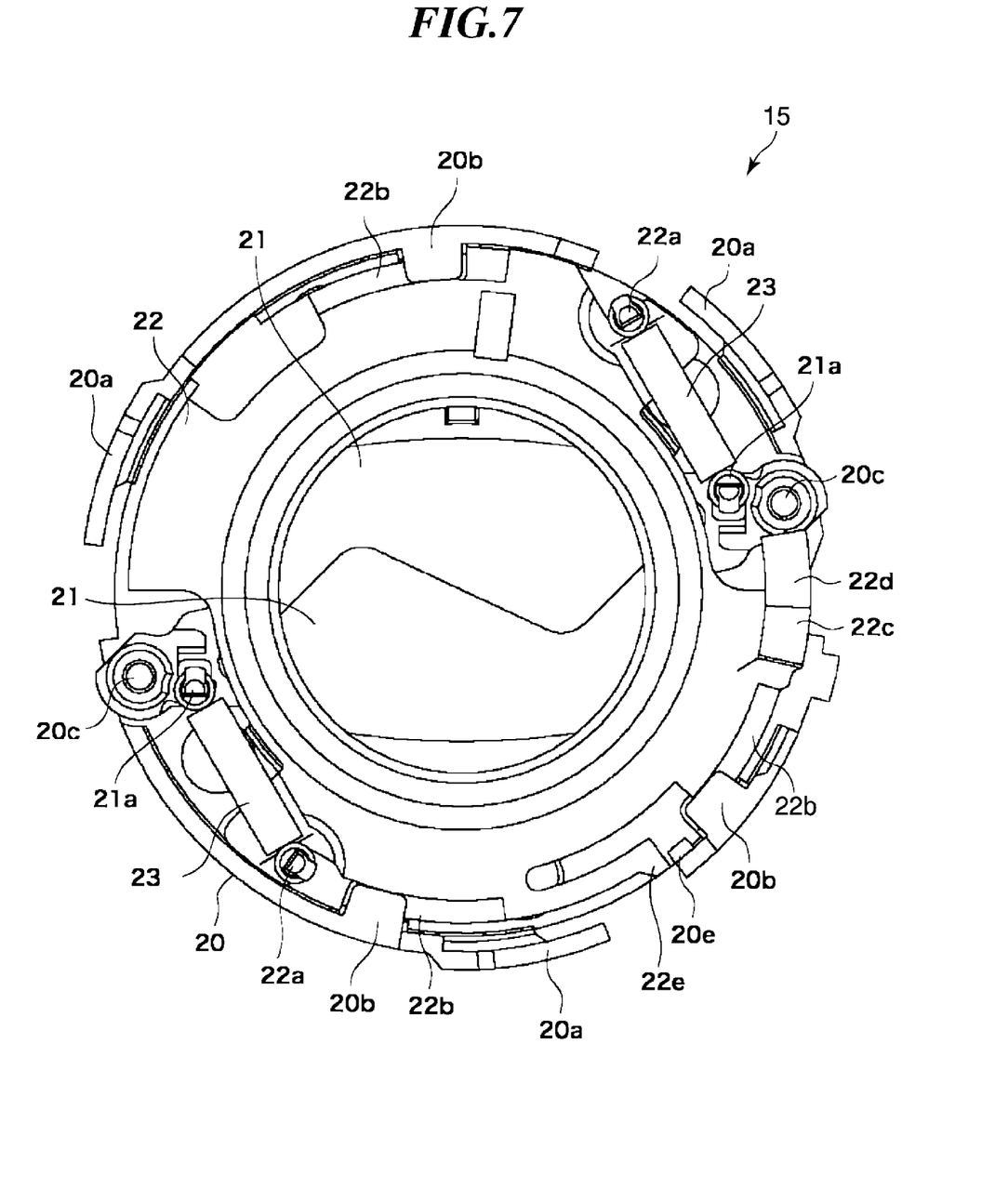
FIG. 7 is a diagram showing the closed state of the barrier unit viewed from the imaging plane side.
Figure 8:
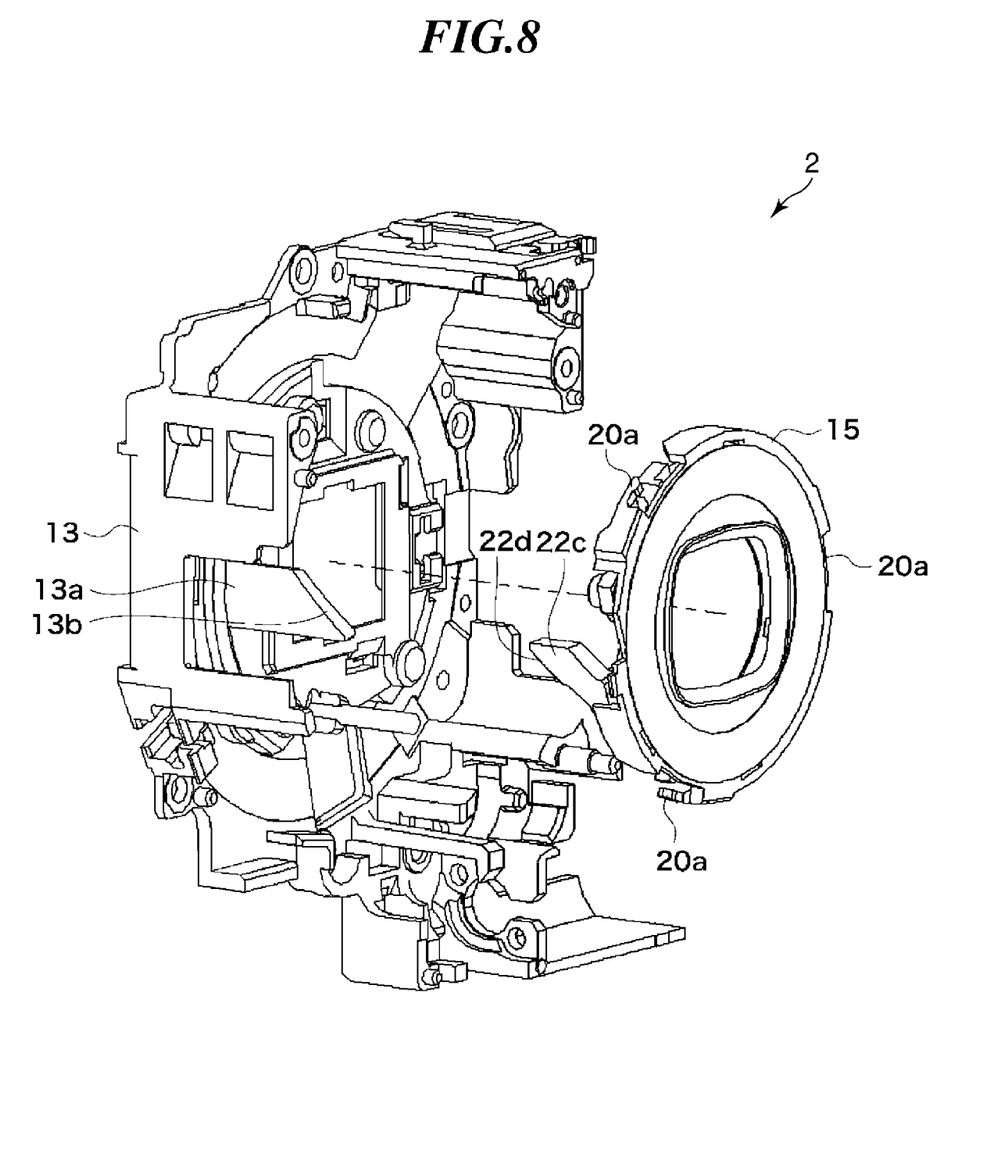
FIG. 8 is a perspective view of the lens barrel protruded outward.
Figure 9:
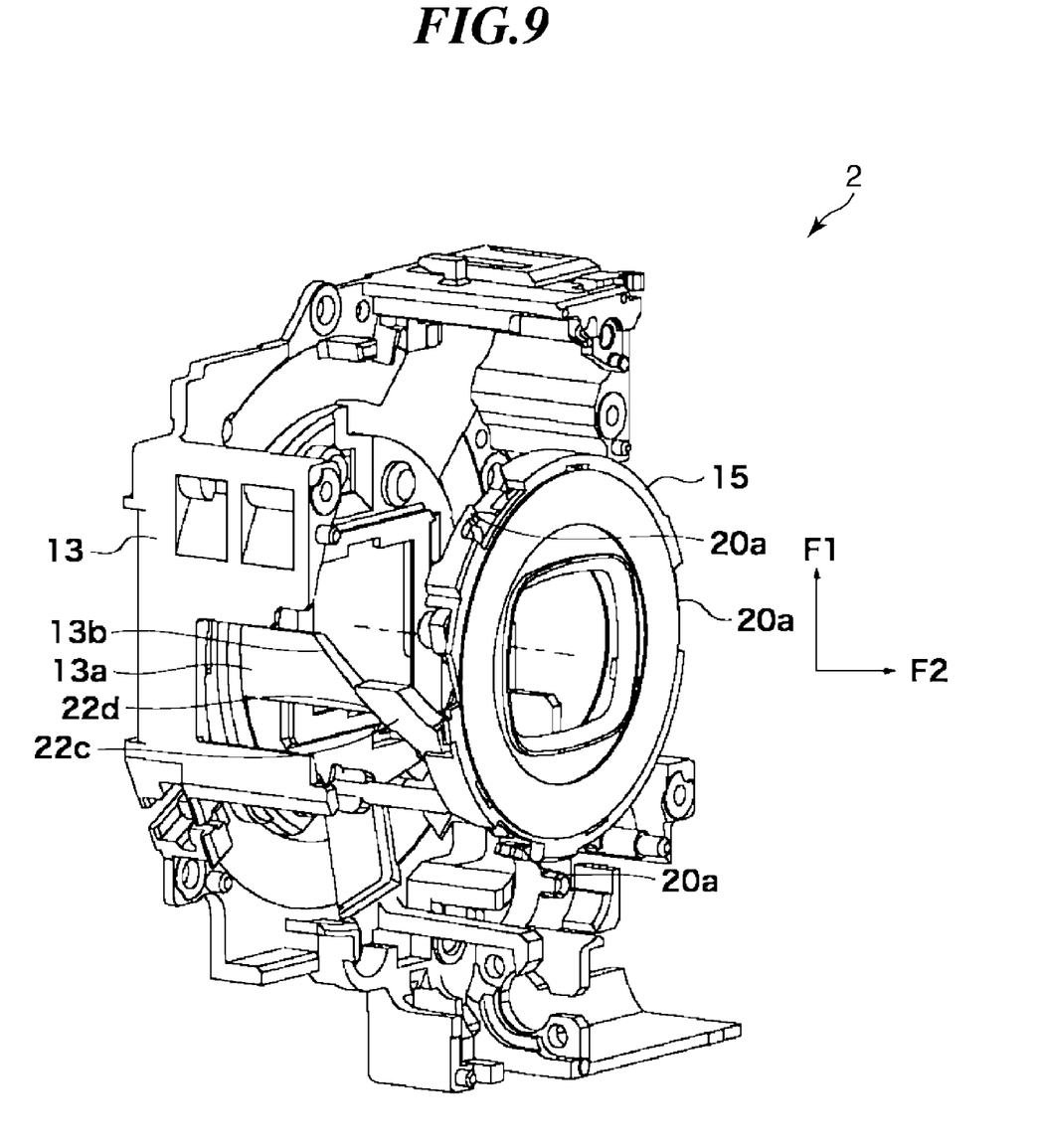
FIG. 9 is a perspective view of the lens barrel showing that the barrier unit abuts on the cam abutting portion of the image sensor holding member.
Figure 10:
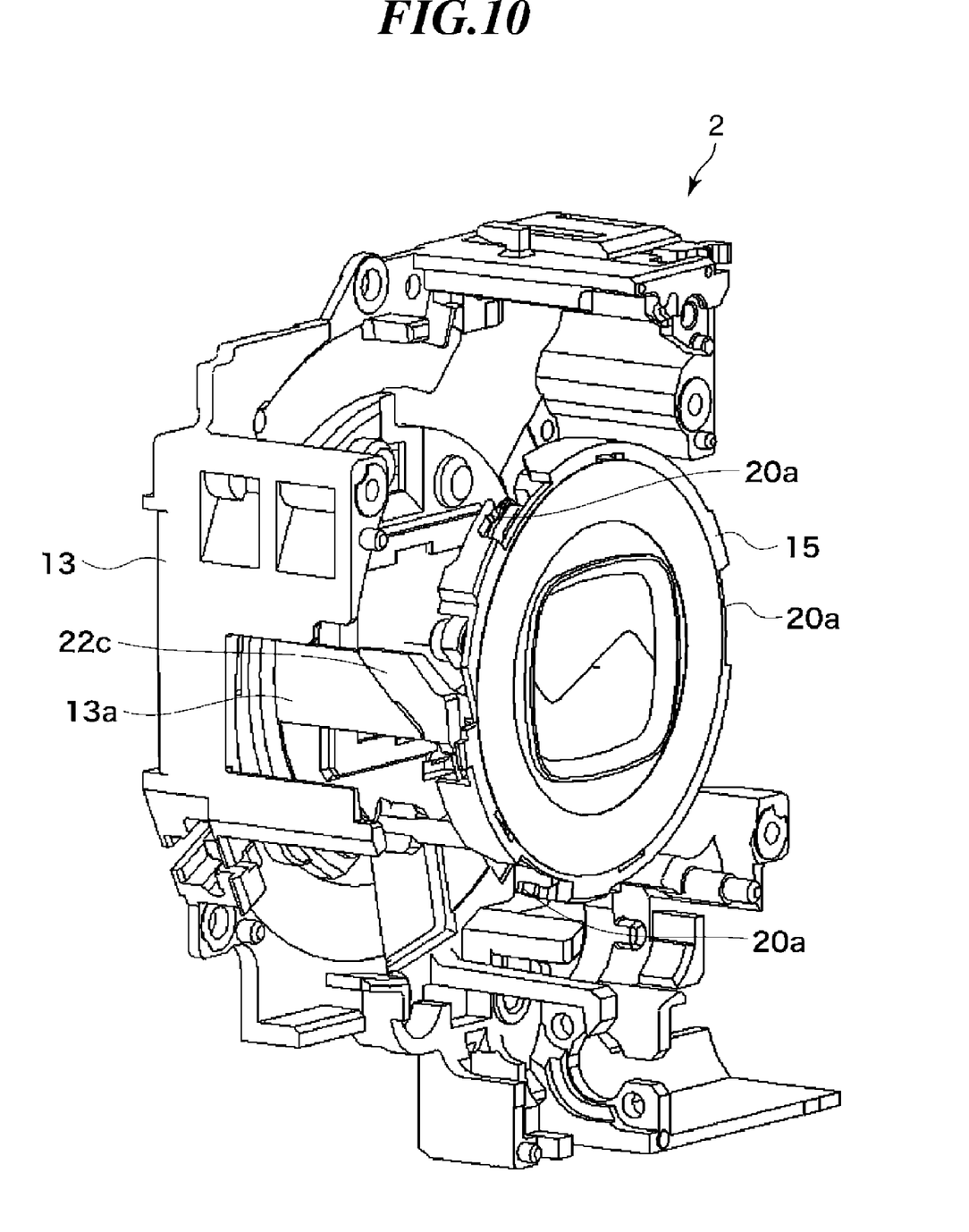
FIG. 10 is a perspective view of the lens barrel which is moved inward (retracted).

FIG. 6 is a diagram showing the open state of the barrier unit 15 viewed from the imaging plane side. FIG. 7 is a diagram showing the closed state of the barrier unit 15 viewed from the imaging plane side. FIG. 8 is a perspective view of the lens barrel 2 protruded outward. FIG. 9 is a perspective view of the lens barrel 2 showing that the barrier unit 15 abuts on the cam abutting portion 13a of the image sensor holding member 13. FIG. 10 is a perspective view of the lens barrel 2 which is moved inward (retracted). For the convenience of description, FIGS. 8 to 10 show only a relationship between the image sensor holding member 13 and the barrier unit 15.

(A) Operation of Barrier Blade from Open to Closed State

The operation of the barrier blade 21 from open to closed state is described below.

The lens barrel 2 is gradually retracted from a protruding state in FIG. 8 and a taper portion 22d of the rotation transmission protrusion 22c of the barrier blade driving member 22 abuts on a taper portion 13b of the cam abutting portion 13a of the image sensor holding member 13 as shown in FIG. 9. As a result, the taper portion 22d of the rotation transmission protrusion 22c is subjected to a force in its taper direction to generate force components F1 and F2 in FIG. 9.

The force component F1 is a force which rotates the barrier blade driving member 22 clockwise and the force component F2 is a force which drives the lens barrel 2 in the protruding direction. On the other hand, the force component F2 is applied to the protrusions 16b of the lens holding member 16 described above or applied by three hook portions 20a provided on the barrier cover member 20 being rotatably coupled with the lens holding member 16. In other words, double static pressure means are provided for the force component F2.

The force component F1 is a force which rotates the barrier blade driving member 22 clockwise through the taper portion 22d thereof when the barrier unit 15 is opened as shown in FIG. 6. This force causes the abutting portion 22f shown in FIG. 5 to retreat and rotates the barrier blades 21 so as to cause the barrier blades 21 to be closed. When the lens barrel 2 is moved inward to a retracted state in FIG. 10, the barrier blade driving member 22 is rotated to an angle required for the barrier blades 21 to be closed, then reaching the state in FIG. 7.

Thus, while the barrier blades 21 are being closed from the open state, the protrusions 16b of the lens holding member 16 are subjected to the force component F2 substantially at the other surface 22h (in FIG. 5) of the rotation transmission protrusion 22c of the barrier blade driving member 22 to which the force component F1 is applied.

In the present embodiment, the force component F2 acts to close the barrier blades 21, thereafter, the claw portion 22e of the barrier blade driving member 22 abuts on the stopper portion 20e of the barrier cover member 20 to rotate the barrier unit 15 in the direction in which the barrier unit 15 is further assembled with the lens holding member 16. In other words, the direction of the force component F1 applied by the cam abutting portion 13a of the image sensor holding member 13 is caused to coincide with the direction in which the barrier unit 15 is assembled to prevent the barrier unit 15 from being detached from the lens holding member 16.

(B) Operation of Barrier Blade from Closed to Open State

The operation of the barrier blade 21 from closed to open state is described below.

The lens barrel 2 is gradually protruded outward from a retracted state in FIG. 10 to gradually decrease a contact portion where the taper portion 22d of the rotation transmission protrusion 22c of the barrier blade driving member 22 is brought into contact with the taper portion 13b of the cam abutting portion 13a of the image sensor holding member 13 and to simultaneously open the barrier blade 21 from the closed state. In the state in FIG. 9, in other words, until the contact portion is lessened to detach the taper portion 22d from the taper portion 13d, the barrier blades 21 are fully opened as shown in FIG. 6.

At this point, the cam abutting portion 13a of the image sensor holding member 13 which applies a force to the rotation transmission protrusion 22c of the barrier blade driving member 22 is retreated from the closed state in FIG. 7. This rotates the barrier blade driving member 22 counterclockwise as shown in FIG. 5 by a spring force of a spring 23 to cause the protrusions 22f to push the abutting portions 21b of the barrier blade 21, and the protrusions 22f having being pushed further rotates the barrier blades 21 clockwise to open them as shown in FIG. 6.

Although the present embodiment describes that the barrier blade driving member 22 is rotated by a force applied by the cam abutting portion 13a of the image sensor holding member 13, another method may be used in which a force is applied by a member different from the image sensor holding member 13 or a force of a rotating member is directly transmitted, provided that the configuration satisfies the features of the present invention.

ADVANTAGES ACCORDING TO THE PRESENT EMBODIMENT

According to the present embodiment, the direction in which the barrier unit 15 is rotated when assembled with the lens holding member 16 coincides with the direction in which the barrier blade driving member 22 is rotated when the barrier blade 21 is closed from its open state.

This allows easily assembling the barrier unit 15 with the lens holding member 16. When closing the barrier blade 21, a force is applied in the direction in which the barrier unit 15 is further assembled with the lens holding member 16. For this reason, other means such as screwing or gluing for firmly fixing the barrier unit 15 are not required, thus allowing the reduction of assembly time due to an improvement in workability and the reduction of cost due to a decrease in the number of damaged products.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2009-33905 filed Feb. 17, 2009, which is hereby incorporated by reference herein in its entirety.

What is claimed is:

1. A lens barrel comprising:
   a barrier unit provided on the front side of a photographic lens and configured to gate an aperture of the photographic lens; and
   a lens holding member capable of being attached to said barrier unit and configured to hold the photographic lens;
   wherein said barrier unit includes:
   a cover member having an aperture with the optical axis as a center;
   a barrier blade attached to the cover member such that the aperture can be opened or closed;
   a barrier blade driving member which is rotatably held with the cover member and has a rotation transmission protrusion extending to the side of an object in the direction of the optical axis; and
   a rotation regulating member formed on the lens holding member and configured to regulate the rotation of said barrier unit when said barrier unit is assembled with the lens holding member while being rotated; and
   wherein the direction in which said barrier unit is rotated when said barrier unit is assembled with the lens holding member coincides with the direction in which the barrier blade driving member is rotated when the barrier blade is closed from the open state.

2. The lens barrel according to claim 1 further comprising at least one protrusion protruding radially inward from the outer wall on the leading edge of the lens holding member,
   wherein the surface of the barrier blade driving member on the object side is drawn into the at least one protrusion on the imaging plane side when said barrier unit is assembled with the lens holding member while being rotated and the positional relationship is maintained from the open state to the closed state of the barrier blades.

3. The lens barrel according to claim 2, wherein
   the surface of the barrier blade driving member on the object side is located at the other side of the surface on which the rotation transmission protrusion are located.

4. The lens barrel according to claim 1 further comprising at least two hook portions extending in the circumferential direction of the cover member,
   wherein the rotation regulating member regulates the rotation of said barrier unit by catching the at least two hook portions from the circumferential direction when said barrier unit is assembled with the lens holding member while being rotated.

* * * * *